ically for heavy motor vehicles" is the title.

United States Patent [19]
Perlini

[11] Patent Number: 4,915,364
[45] Date of Patent: Apr. 10, 1990

[54] FLUID SUSPENSION UNIT, PARTICULARLY FOR HEAVY MOTOR VEHICLES

[76] Inventor: Roberto Perlini, Corso Venezia 93, 37047 San Bonifacio, Italy

[21] Appl. No.: 122,281

[22] Filed: Nov. 18, 1987

Related U.S. Application Data

[63] Continuation of Ser. No. 414,063, Sep. 2, 1982, abandoned, which is a continuation of Ser. No. 178,606, Aug. 15, 1980, abandoned.

[30] Foreign Application Priority Data

Oct. 17, 1979 [IT] Italy .............................. 69018-A/79

[51] Int. Cl.⁴ .............................................. F16F 5/00
[52] U.S. Cl. .................................. 267/64.26; 188/269; 188/284; 267/64.15; 267/64.25
[58] Field of Search ............................... 188/284, 269; 267/64.15, 64.16, 64.17, 64.18, 64.22, 64.25, 64.26; 280/DIG. 1

[56] References Cited

U.S. PATENT DOCUMENTS

| | | | |
|---|---|---|---|
| 770,128 | 9/1904 | Teal | 207/DIG. 1 |
| 1,371,648 | 3/1921 | Schmidt | 280/DIG. 1 |
| 1,439,417 | 12/1922 | Holmes | 267/64.16 |
| 1,457,157 | 5/1923 | Galbreath | 267/64.18 X |
| 1,664,510 | 4/1928 | Hughes, Jr. | 267/64.16 |
| 3,000,624 | 9/1961 | Cislo | 280/DIG. 1 |
| 3,168,302 | 2/1965 | Burris | 267/64.25 |
| 3,387,840 | 6/1968 | Bechmar et al. | |
| 3,391,920 | 7/1968 | Schmidt | 267/64.16 |
| 3,444,830 | 12/1966 | Doetcsh | 267/64 |
| 3,524,634 | 8/1970 | Schmidt | 267/64.16 |
| 3,549,168 | 12/1970 | Swanson | 267/64.16 X |
| 3,720,425 | 3/1973 | Asano et al. | 267/64.16 X |

FOREIGN PATENT DOCUMENTS

| | | |
|---|---|---|
| 1291568 | 7/1968 | Fed. Rep. of Germany . |
| 1530741 | 11/1969 | Fed. Rep. of Germany ... 267/64.16 |
| 680672 | 5/1970 | Fed. Rep. of Germany ... 267/64.17 |
| 1780117 | 1/1972 | Fed. Rep. of Germany . |
| 1655029 | 2/1972 | Fed. Rep. of Germany . |
| 2301482 | 8/1973 | Fed. Rep. of Germany ... 267/64.16 |
| 423334 | 2/1911 | France . |
| 1554454 | 12/1968 | France . |
| 2017647 | 5/1970 | France . |
| 2157652 | 6/1973 | France . |
| 2270490 | 5/1975 | France . |
| 430337 | 5/1935 | United Kingdom . |
| 554197 | 11/1942 | United Kingdom ............. 267/64.15 |
| 806824 | 12/1958 | United Kingdom . |
| 1055017 | 3/1965 | United Kingdom . |
| 1169999 | 11/1969 | United Kingdom . |
| 1382318 | 1/1975 | United Kingdom ............. 267/64.16 |
| 1500714 | 2/1978 | United Kingdom . |

Primary Examiner—George E. A. Halvosa
Attorney, Agent, or Firm—Renner, Otto, Boisselle & Sklar

[57] ABSTRACT

A fluid suspension unit, particularly for heavy motor vehicles, comprising an outer cylinder and an inner cylinder slidably mounted within the outer cylinder, the outer and inner cylinders defining therein a chamber of variable volume containing hydraulic fluid and compressed gas. A diaphragm divides the chamber into two portions and has an opening therein which is normally closed by a mushroom valve. The upper portion of the chamber has a constant volume and a prefixed pressure and the lower portion has a variable volume and a variable pressure, lower or at most equal to that of the upper portion. The mushroom valve, normally closed, opens mechanically only when the suspension reaches a predetermined degree of compression that is when the pressure in the two portions of the chamber are the same. The valve is closed by gravity when the suspension returns to the same predetermined degree of compression.

19 Claims, 3 Drawing Sheets

FLUID SUSPENSION UNIT, PARTICULARLY FOR HEAVY MOTOR VEHICLES

This application is a continuation of application Ser. No. 414,063, filed Sept. 2, 1982, now abandoned, and which is a continuation of application Ser. No. 178,606, filed Aug. 15, 1980, now abandoned.

This invention relates to a fluid suspension unit, particularly a pneumatic or hydropneumatic suspension unit, especially for heavy motor vehicles such as trucks, earth moving machines and the like.

BACKGROUND OF THE INVENTION

In addition to the conventional vehicle suspension systems formed of leaf or helical springs having a constant stiffness at all loading conditions, pneumatic and hydropneumatic suspensions are known in which the stiffness varies according to an exponential law determined by the adiabatic transformation of the compressed gas forming the elastic suspension element.

Such pneumatic and hydropneumatic suspensions are more compact and reliable than those having a mechanical elastic element, but as the compression and expansion curve of the gas is not linear their performance is not so good over the entire range of applied loads from zero to maximum loading.

As the gradient of this curve increases with increased yielding of the suspension, it is evident that an approximate linearity of response of the suspension can only be maintained when the difference between maximum and minimum loading is relatively small such as in the case of the front axle of a truck. However, when the difference between maximum and minimum loading is very high such as in the case of the truck body supporting axle, it is impossible to obtain a satisfactory performance both at maximum and minimum loading because when the suspension is dimensioned for adequate behaviour at maximum loading, it will yield too much without load and, on the other hand, when the suspension is dimensioned to behave properly without load, it will be too rigid at full load.

The compromise solutions hitherto adopted are unsatisfactory not only because the poor behaviour of the suspension will reduce the comfort of the passenger or driver, but above all because it will be detrimental to the stability and safety of the vehicle as it is running on the road.

To achieve normal stiffness of the suspension in all conditions of loading, the present applicant has already proposed and used an outer chamber located outwardly of the suspension and communicating with the compressed gas inside the suspension, this outer chamber containing gas at higher pressure which acts to change the behaviour of the suspension at high loading. This solution has permitted to extend the range of use of the suspension but at the expense of increased overall dimensions and higher costs of production.

SUMMARY OF THE INVENTION

It is an object of the present invention to provide a pneumatic or hydropneumatic suspension unit that will permit to vary the stiffness of the suspension with varying loading of the vehicle without using an outer storage chamber and without substantially increasing the production cost of the suspension.

This object is achieved according to the present invention by providing a pneumatic or hydropneumatic suspension unit comprising an outer cylinder and an inner cylinder sealingly mounted for sliding movement within the outer cylinder and defining a chamber of variable volume containing a hydraulic fluid and a gas in predetermined proportions, characterized in that the gas containing portion of the chamber is divided by a diaphragm provided with an opening normally closed by means controlled by the relative position between the two cylinders to open when the suspension unit reaches a predetermined degree of compression. Preferably the diaphragm extends transversely within the inner cylinder and is provided with a mushroom valve arranged to be actuated by the displacement of the outer cylinder relative to the inner cylinder during compression of the fluid suspension unit. A longitudinal guide member is firmly secured to the inside of the inner cylinder and the mushroom valve has a valve stem slidably received within the longitudinal guide member and a projecting free end serving as a pusher rod arranged to engage a closed bottom end of the outer cylinder as the fluid suspension unit is subjected to a predetermined contraction. Also preferably the longitudinal guide member is formed integrally with and serves as a support member for the diaphragm.

Other objects and advantages of the invention will become apparent in the course of the following description.

BRIEF DESCRIPTION OF THE DRAWINGS

A preferred embodiment of the invention will now be described by way of example and with reference to the accompanying drawings, in which.

DETAILED DESCRIPTION

Figure 1:
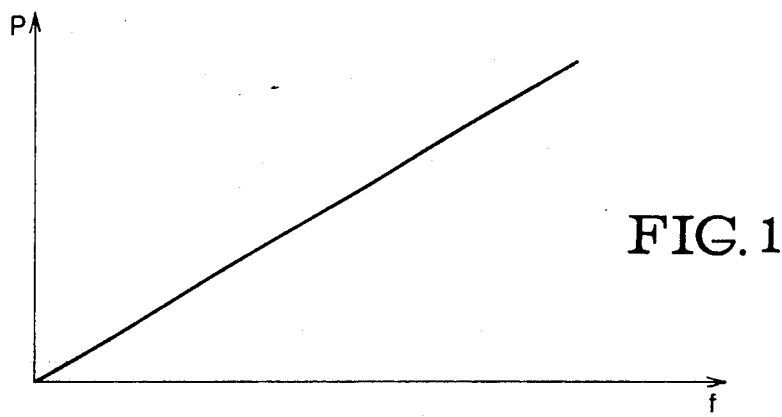
FIG. 1 is a graph illustrating the law governing the relation between the applied load and the yielding of a conventional suspension of the type having a mechanical elastic suspension element.

The graph of FIG. 1 shows the relation between the load P applied to the suspension and its yielding f in a conventional suspension of the type having an elastic suspension element such as a leaf or helical spring. The yielding of the suspension under the applied load is linear over the entire range of admissible yielding, i.e. the stiffness of the suspension is constant with varying loads.

Figure 2:
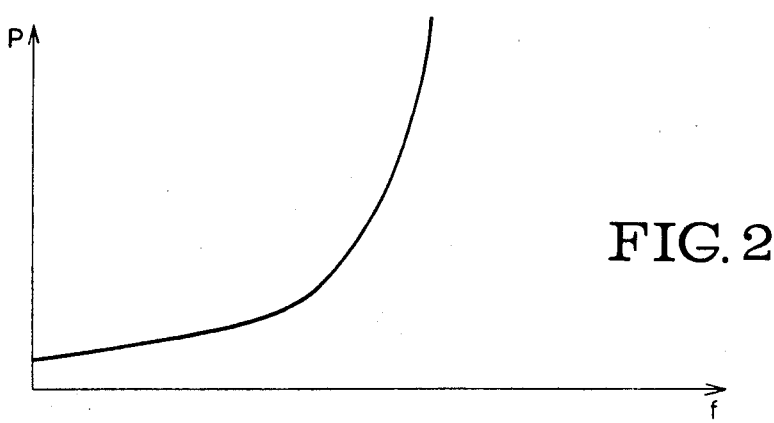
FIG. 2 is a similar graph for a conventional hydropneumatic suspension.

FIG. 2 illustrates the law governing the relation between the applied load and yielding of a conventional hydropneumatic suspension in which the elastic element is formed by compressed gas. As will be evident from this graph, to obtain an approximately linear response over the entire range of varying loads, it is necessary to use only a part of the curve, for example, the portion located below the bend in the curve because at higher loads yielding will tend to cease.

Figure 4:
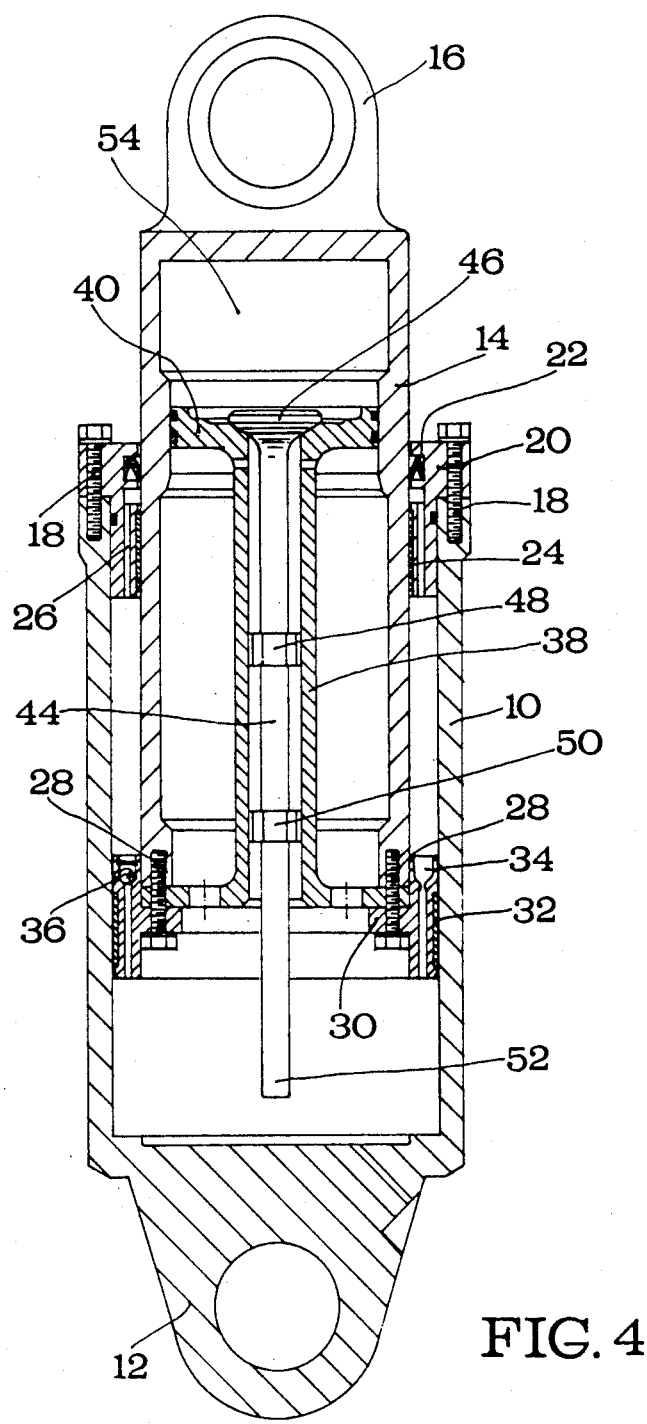
FIG. 4 is an axial section through a hydropneumatic suspension unit according to the present invention in a first position of operation.
Figure 5:
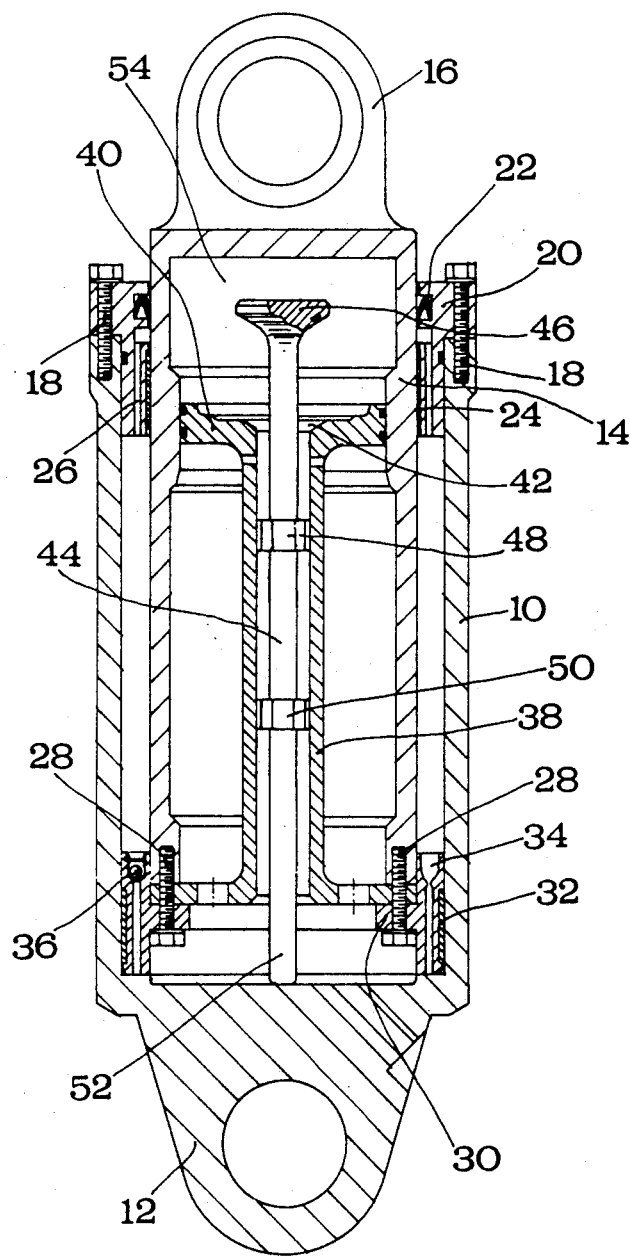
FIG. 5 is a section as in FIG. 4, but showing the hydropneumatic suspension unit in a second position of operation.

A hydropneumatic suspension unit according to the preferred embodiment of the invention will now be described with reference to FIGS. 4 and 5. This suspension unit comprises an outer cylinder 10 having an open upper end and a closed lower end provided with an eye bracket 12 for pivotal connection to a wheel axle (not shown), and an inner cylinder 14 mounted for sliding movement within the outer cylinder 10 and having an open lower end and a closed upper end and provided with an eye bracket 16 for pivotal connection to the chassis.

A flanged sleeve 20 is secured by screw bolts 18 to the open end of the outer cylinder 10 for guiding the inner cylinder 14 during its sliding movement and is provided with an oil sealing gasket 22 as well as a sliding bearing 24 for slidably receiving the inner cylinder 14. The flanged sleeve 20 is in a manner known per se provided with oil flow passage 26 to permit the oil to return to the interior of the suspension unit.

A flanged sleeve 30 is secured by screw bolts 28 to the open end of the inner cylinder 14 and provided with a sliding bearing 32 for slidably guiding the inner wall of the outer cylinder 10 and also comprises, in a manner known per se, restricted oil flow passages 34 as well as check valves 36 to permit free return flow of the oil or hydraulic fluid during the contraction of the suspension unit and restricted oil flow during its extension, as will be more fully explained hereinafter.

The same screw bolts 28 also serve to secure within the inner cylinder 14 a tubular guide member 38 which upwardly terminates in a baffle plate or diaphragm 40 sealingly engaging the inner wall of the inner cylinder 14 and having a central hole 42 extending coaxially of the tubular guide member 38. Slidably received within the tubular guide member 38 is a valve stem 44 of a mushroom valve 46 for sealingly closing the hole 42 in the diaphragm 40. The valve stem 44 is provided with guide collars 48, 50 slidably engaging the inner wall of the tubular guide member 38. The valve stem 44 extends beyond the open end of the inner cylinder 14 by a predetermined length, according to criteria which will become evident from the following description, and terminates in a pusher rod 52.

The cavity defined within the inner and outer cylinders 14 and 10, respectively, contains a predetermined amount of oil or other hydraulic fluid, not shown in the drawings, the amount of this fluid being selected in such a manner that when the suspension unit is partially or completely extended there will remain a certain amount of compressed air inside the inner cylinder both above and below the diaphragm 40. As shown in FIG. 4, the length of the valve stem 44 is so selected such that the pusher rod 52 will not engage the closed bottom end of the outer cylinder 10 when the suspension unit is almost completely extended with minimum load, i.e. when the vehicle is empty. The pressure of the compressed air contained below the diaphragm 40 will be predetermined to provide the best operating conditions of the suspension unit under minimum load conditions whereas the chamber 54 which is located above the diaphragm 40 and completely isolated from the rest of the suspension unit when the mushroom valve is closed, will be filled with gas compressed to a considerable pressure, as will be evident from the following description.

When the suspension unit is thus operating under minimum load conditions so that the pusher rod 52 will not engage the bottom end of the outer cylinder 10, the behaviour of the suspension unit will be similar to that of a conventional hydropneumatic suspension unit having the same dimensions as the one illustrated. However, for example, when the vehicle is fully loaded, the outer and inner cylinders will shift relative to each other and the pusher rod 52 will engage the bottom end of the outer cylinder 10 and will open the mushroom valve 46 against the pressure prevailing in the chamber 54, thus producing a single chamber comprising the cylinder portions located above and below the diaphragm 40 and both containing compressed gas. The pressure of the compressed gas in the chamber 54 is so selected such that when the mushroom valve 46 is opened by mechanical engagement of the pusher rod with the bottom of cylinder 10, the pressure of the compressed air or gas below the diaphragm 40 will at such instance be equal to the predetermined pressure in the chamber 54.

As the amount of compressed gas now acting within the suspension unit has thus varied, the law governing load and yielding of the suspension unit is also changed and by suitably designing and dimensioning the suspension unit, an additional range of adjustment of the stiffness of the suspension unit is obtained.

The overall behaviour of the suspension unit described above is illustrated by the graph of FIG. 3 in which the curve a represents the behaviour of the suspension unit when the mushroom valve 46 is closed, the position Q indicates the moment of opening of the valve and the curve b indicates the behaviour of the suspension unit after the valve has opened. The dasn line c indicates the manner in which the suspension unit would behave if it had been constructed according to the teaching of the prior art, i.e. without the upper chamber 54 and the mushroom valve 46.

Figure 3:
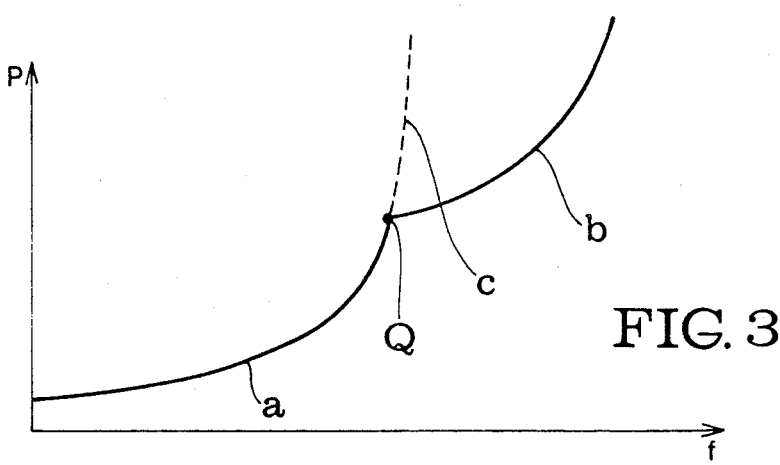
FIG. 3 is a similar graph for a hydropneumatic suspension according to the invention.

As the load applied to the suspension unit diminishes, the latter will return to a position permitting closing of the mushroom valve 46 and the chamber 54 will be isolated again and the pressure therein will return to its predetermined value as closure of the valve will obviously take place at the position Q of the graph of FIG. 3. In this connection it is to be noted that one of the advantages of the present suspension unit consists in that at each opening and subsequent closing of the mushroom valve 46, the suspension unit will be automatically reset, as the point of closing of the valve is determined only by the length of the valve stem 44. Thus, it is unnecessary to periodically reset the pressure in the chamber 54 and therefore the present suspension unit can be used and handled as a conventional hydropneumatic suspension unit. In particular, it is not even necessary to provide for separate setting of the pressure in the chamber 54 as above indicated since, once a predetermined overall amount of compressed gas has been admitted into the suspension unit, such gas will be automatically distributed and will assume different pressures in the chambers above and below the diaphragm 40 after the mushroom valve 46 opens and subsequently closes again for the first time as well as each subsequent time.

Although a preferred embodiment of the invention has thus been described by way of example, it will be obvious to those skilled in the art that the illustrated principle of construction of a hydropneumatic suspension unit may be further extended, for example, by adding a further still larger pressure chamber above the chamber 54 with an associated valve to be opened by a predetermined contraction of the suspension unit. In this manner a characteristic curve of variation of the yield strength as a function of the applied load is obtained which comprises three arcs of a circle instead of the two shown in FIG. 3. Theoretically any desired number of such additional chambers for constantly increasing pressures may be provided.

It will also be evident that although in the described preferred embodiment the mushroom valve is controlled by a mechanical pusher rod, this being the simplest form of providing controlled opening of the mushroom valve, such opening may also be controlled by other means, for example, an electromagnet controlled by a microswitch arranged to sense the displacement of the inner cylinder with respect to the outer cylinder, or by still other means depending on the type of application.

Finally, it will be evident that the suspension unit described above may also be used with an external overpressure chamber arranged outside the suspension unit as is known in the prior art to provide a characteristic curve of operation composed of three or more arcs of a circle.

Further, the described principle of operation may also be applied to a completely pneumatically operated suspension unit.

Also the described suspension unit may not only be used in heavy motor vehicles but also for other purposes such as in stationary machines where a differential behaviour of the suspension is required.

All these modifications and variations are intended to be covered by the appended claims.

I claim:

1. A fluid suspension unit, particularly for heavy motor vehicles, comprising an outer cylinder and an inner cylinder sealingly mounted for sliding movement within said outer cylinder and defining a chamber of variable volume containing a hydraulic fluid and a gas in predetermined proportions, characterized in that the gas containing portion of said chamber is divided into first and second sub-portions, respectively of low and high pressure, by a diaphragm provided with an opening normally closed by means controlled by the relative position between the two cylinders to open by mechanical action exerted on said means when the suspension unit reaches a predetermined degree of compression and to maintain said opening open as long as said suspension unit is compressed to an extent equal or greater than said predetermined degree of compression, such as to make the pressure equal in said first and second sub-portions, the gas in said first sub-portion being operative to support a load and the gas in said second sub-portion being in direct communication with and cooperative with the gas in said first sub-portion to support a load only when said opening is open upon the suspension unit having reached such predetermined degree of compression, and wherein said first and second sub-portions of said chamber contain respective portions of said gas, and said respective portions of said gas are in the same proportion after each closing of said opening in said diaphragm, whereby the mechanical action exerted on said means to open is not operative to change said proportion of said gas portions for effecting height adjustment.

2. A fluid suspension unit as claimed in claim 1, wherein said diaphragm extends transversely within said inner cylinder and is provided with a mushroom valve arranged to be actuated by the displacement of said outer cylinder relative to said inner cylinder during compression of the fluid suspension unit.

3. A fluid suspension unit as claimed in claim 2, wherein a longitudinal guide member is firmly secured to the inside of said inner cylinder and said mushroom valve has a valve stem slidably received within said longitudinal guide member and having a projecting free end serving as a pusher rod arranged to engage a closed bottom end of said outer cylinder as the fluid suspension unit is subjected to a predetermined contraction.

4. A fluid suspension unit as claimed in claim 3, wherein said longitudinal guide member is formed integrally with and serves as a support member for said diaphragm.

5. A fluid suspension unit as claimed in claim 1, wherein said first sub-portion is in communication with the fluid containing portion of said chamber and said second sub-portion is in communication with said fluid containing portion only when interconnected to said first sub-portion by opening of said valve means.

6. A fluid suspension unit as set forth in claim 1, wherein said diaphragm extends transversely within inner cylinder.

7. A fluid suspension unit comprising an outer cylinder and an inner cylinder sealingly mounted for sliding movement within the outer cylinder and defining a chamber of variable volume containing a hydraulic fluid and a gas in predetermined proportions, characterized by means for dividing the gas containing portion of said chamber into a first sub-portion of low pressure and a second sub-portion of high pressure which respectively contain portions of said gas in and normally out of load supporting relationship with said inner and outer cylinders, said means for dividing including a divider having a passage interconnecting said first and second sub-portions and valve means for opening and closing said passage respectively to directly communicate and isolate said first and second sub-portions with and from each other, said divider being fixed to one of said outer and inner cylinders, said valve means being mechanically controlled by the relative position between said cylinders directly to communicate said first and second sub-portions with each other upon the suspension unit reaching a predetermined degree of compression and to maintain direct communication between said first and second sub-portions as long as said suspension unit is compressed to an extent equal or greater than said predetermined degree of compression, so that gas contained in said second sub-portion will then be at the same pressure as and cooperative with gas in said first sub-portion to support a load, and wherein said portions of said gas are in the same proportion after each closing of said passage in said divider, whereby the mechanical control of said valve means is not operative to change said proportion of said gas portions for effecting height adjustment.

8. A fluid suspension unit as claimed in claim 7, wherein said valve means includes a valve normally closing said passage, and mechanical means operative to open said valve upon the suspension unit reaching such predetermined degree of compression.

9. A fluid suspension unit as claimed in claim 8, wherein said first and second sub-portions are respectively in and out of communication with the fluid containing portion of said chamber when said passage is closed by said valve.

10. A fluid suspension unit as claimed in claim 9, wherein said divider includes a diaphragm having an opening defining said passage.

11. A fluid suspension unit as claimed in claim 10, wherein said diaphragm extends transversely within said inner cylinder and said valve is arranged to be actuated by the displacement of said outer cylinder relative to said inner cylinder during compression of the fluid suspension unit.

12. A fluid suspension unit as claimed in claim 11, wherein a longitudinal guide member is firmly secured to the inside of said inner cylinder and said valve has a valve stem slidably received within said longitudinal guide member and having a projecting free end serving as a pusher rod arranged to engage a closed bottom end of said outer cylinder as the fluid suspension unit is subjected to a predetermined contraction.

13. A fluid suspension unit as claimed in claim 12, wherein said inner cylinder has a closed outer end and an open inner end, said diaphragm is spaced from said inner end so that part of said first sub-portion is located within said inner cylinder, and said guide member has a guide for said valve stem located proximate said inner end of said inner cylinder.

14. A fluid suspension unit as claimed in claim 8, wherein the pressure of the gas in second sub-portion is automatically reset upon opening and closing of said passage to a predetermined elevated pressure equal the pressure of the gas in said first sub-portion when the suspension unit reaches such predetermined degree of compression.

15. A fluid suspension unit as claimed in claim 7, wherein said divider includes a diaphragm including said passage and extending transversely within said inner cylinder to separate said first and second sub-portions, and said valve means includes a valve normally closing said passage, and mechanical means operative to open said valve upon the suspension unit reaching such predetermined degree of compression.

16. A fluid suspension unit as claimed in claim 15, wherein a longitudinal guide member is secured within said inner cylinder, and said mechanical means is elongate and is lidably received within said guide member.

17. A fluid suspension unit as set forth in claim 16, wherein said valve is a mushroom valve, and said mechanical means includes a stem attached to said valve, said stem having a free end arranged to engage a closed bottom end of said outer cylinder as the fluid suspension unit is subjected to such predetermined degree of compression.

18. A fluid suspension unit as set forth in claim 7, wherein said valve means includes a mushroom valve having an elongate stem, and further comprising a guide member in which said stem is guided for longitudinal movement.

19. A fluid suspension unit as set forth in claim 18, wherein said divider includes a diaphragm extending transversely within said inner cylinder, and said guide member is formed integrally with said diaphragm.

* * * * *